G. W. RODE, Jr.
VEHICLE TIRE.
APPLICATION FILED APR. 22, 1920.

1,374,390.

Patented Apr. 12, 1921.

George W. Rode, Jr.
INVENTOR

BY James A. G. Koehl
ATTORNEY

UNITED STATES PATENT OFFICE.

GEORGE W. RODE, JR., OF BROOKLYN, NEW YORK.

VEHICLE-TIRE.

1,374,390.    Specification of Letters Patent.    Patented Apr. 12, 1921.

Application filed April 22, 1920. Serial No. 375,720.

*To all whom it may concern:*

Be it known that I, GEORGE W. RODE, Jr., a citizen of the United States, residing at Brooklyn, in the county of Kings and State of New York, have invented certain new and useful Improvements in Vehicle-Tires, of which the following is a specification.

This invention relates to tire and rim construction for vehicle wheels and more particularly to that type of wheel which is used in connection with automobiles.

An object of the invention is to provide a puncture proof tire characterized by a shoe or outer casing of rubber, and an inner resilient body, the latter being structurally formed so that it possesses varying degrees of elasticity from its core or center to its extreme outer part so that a cushioning or buoyant action comparing favorably with a pneumatic tire will be produced.

Another object of the invention is to provide a resilient tire which will contain the beneficial and functional advantages of a pneumatic tire and structural features which will eliminate many of the disadvantages of a tire of this type while giving added efficiency, greater durability, and low cost of up-keep.

A further important object of the invention is to provide a tire having a single rim engaging bead, the tire being reinforced at both sides of the bead and arranged to snugly rest against the flanges of the rim to co-act therewith in such manner that the lateral strains will be taken up by the sides of the tire and not by the bead, thus guarding against undue mutilation of said bead or accidental pulling away of the tire from the rim by centrifugal force.

With these ends in view this invention consists in the details of construction and combination of elements hereinafter set forth and thence specifically designated by the claims.

In order that those skilled in the art to which this invention appertains, may understand how to make and use the same, the construction and operation will be described in detail, referring to the accompanying drawings forming part of this specification in which.

Figure 1:
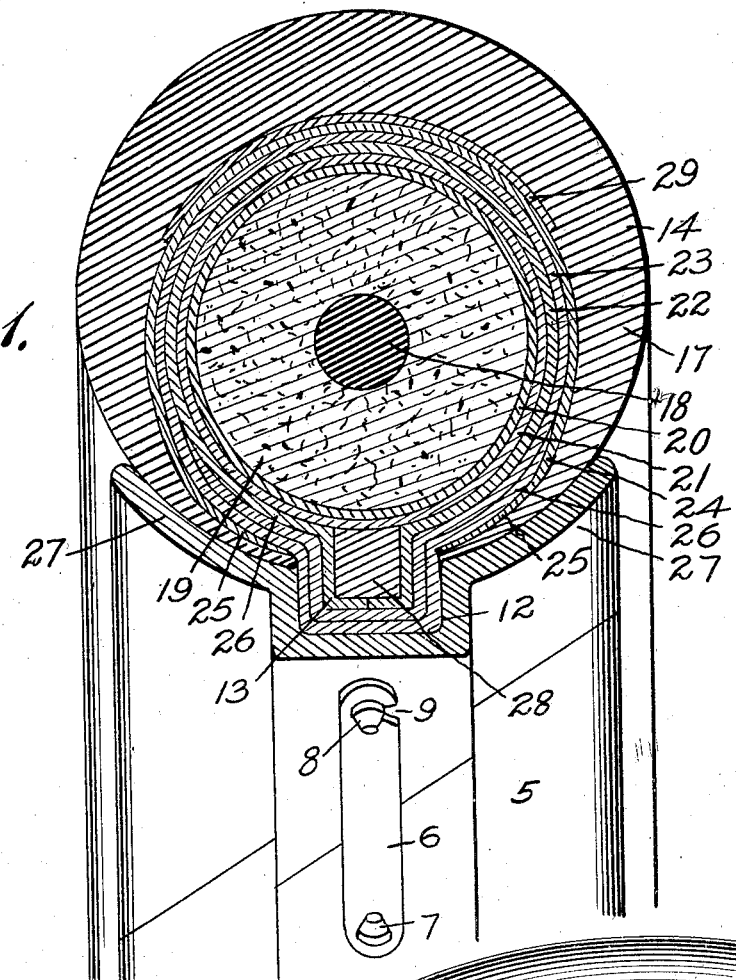
Figure 1 is a vertical section through my improved tire and rim.
Figure 2:
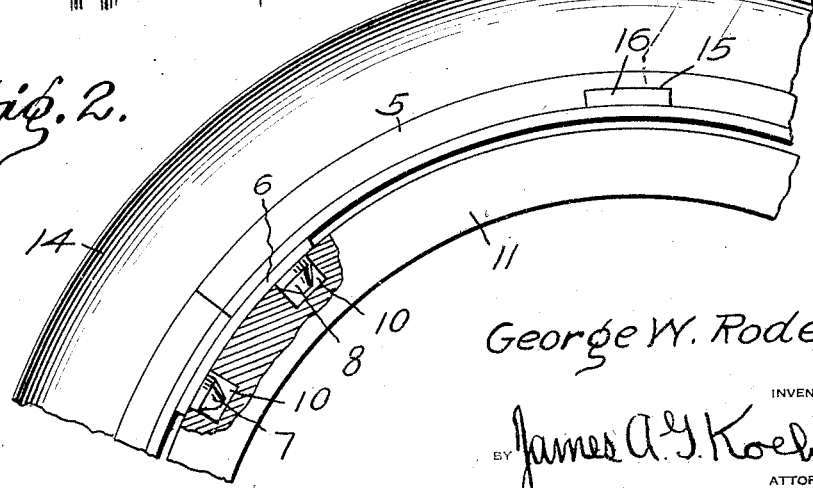
Fig. 2 is a side view of a portion of same with parts in section.

In carrying the invention into practice, use is made of a split rim 5 of the character capable of being respectively expanded and contracted or adjusted in helicoidal fashion to permit of its quick and convenient attachment to or removal from the tire. On the under face of the rim is a latch device 6 of any suitable well known construction for holding the rim ends normally against each other as clearly shown in Fig. 2. This device 6 is mounted to swing on a stud 7 on one of the rim ends, and as illustrated, the other rim end is provided with a similar stud 8 adapted to engage in the keeper recess 9 in said device when it is desired to hold the rim in its expanded condition. The studs 7 and 8 are also of the type which fit in retaining recesses 10 formed in the felly 11 of the wheel. In this manner, it will be understood that the rim will be held against circumferential movement when in place upon said felly.

The rim 5 is provided with a central channel 12 which receives an annular bead 13 formed as part of the tire 14. The bead is recessed at 15 to receive the lug 16 on the outer face of the felly. Through this novel arrangement, it follows that the rim, when applied to the felly of the wheel is secured against independent rotation thereon and at the same time, the said rim is correspondingly fixed to the said tire to hold the latter against circumferential movement. The felly may be of any suitable well known construction and if characterized by the essential features above described, no particular attention need be given other details of construction thereof as they are purely mechanical and common to most wheels of the quick demountable type.

The tire 14 consists of a shoe or outer undivided covering or casing 17, a central core 18 of solid rubber, embedded in a body of sponge or cellular rubber 19 or similar material. This core 18 is endless and arranged in concentric relation to the said outer shoe. In order that maximum strength is given the tire, the body 19 is incased in many windings of rubberized textile materials 20, 21, 22, 23 and 24, the latter materials 23 and 24 being arranged so that their terminals 25—25 and 26—26 multiply the plies of materials at the points where the tire rests against the flanges 27—27 of the rim 5. The bead 13 is formed by associating the several reinforcing materials with an annular strip or ring 28 which is preferably made of metal or hard material so that the tire is held in close confinement with the rim against the action of centrifugal force. However, this ring may be made of canvas and suitably reinforced if desired. The core 18 of solid rubber is constructed in proportion to the mass of material contained in the body 19 so that the tire has a normal tendency to snugly hug the rim and it co-acts with the bead to prevent the tire from sagging in an outward direction by the action of centrifugal force when the wheel is in motion. It is further constructed in such manner and proportion to the mass of material in the body 19 that the tire is yieldable in many directions from the center to its extreme outer portion. When characterized by these features in the combination herein described, the tire possesses all of the good advantages of a pneumatic tire with an elimination of those bad features common to tires of the inflatable tube variety. The flanges 27—27 of the rim take up the greatest amount of strains and lateral stresses when applied to the tire and in this manner, the bead 13 is guarded to an appreciable extent against being ruptured or prematurely destroyed. These flanges, in combination with the lug 16 and mating recess 15 further serve to prevent the parts from becoming accidentally disorganized, the lateral strains being taken up by one and the circumferential strains by the other of said parts. The fabrics 20 and 21 are preferably of open mesh or weave, likewise the fabric breaker strip 29. All of these parts of the tire are designed to give the highest measure of efficiency, durability and sensitiveness, the fabrics 20 and 21 serving to permit of expansion of the core rubber when forming said core and secondly operating to permit the core to bulge outward when in use in the tire. The open weave of the strip 29 insures a good binding action between it and the tread rubber and adjacent inner reinforcing fabrics of the tire. It should be understood that the several parts which constitute the tire are all vulcanized together so that there will not exist the tendency of such parts to creep relatively or leave one another when the wheel is in motion.

While I have herein fully shown and described and have pointed out in the appended claims certain novel features of construction, arrangement and operation which characterize my invention, it will be understood by those skilled in the art that various omissions, substitutions, changes in form, proportions, sizes and details of the tire and rim, of the materials used, and their operation may be made within the scope of the appended claims.

Having thus described the invention what I claim as new and desire to secure by Letters Patent is:

1. A tire comprising an outer shoe of resilient material, a core of solid rubber located in said shoe and arranged concentrically thereof and consisting of a continuous strip, a body of soft cellular-yieldable-material between the core and the walls of the shoe, a bead, and fabric materials separating the walls of the shoe from said cellular material and having interlocked connection with said bead, all of said parts vulcanized together.

2. In a tire structure, the combination of a casing, a body of cellular material inclosed by said casing, a bead on said casing, a core embedded in said cellular material and consisting of an annular strip of material, and a fabric material interposed between the casing and said cellular body and permanently connected with said bead.

3. In a tire structure, the combination of a casing, a body of cellular material inclosed by said casing, a bead formed on said casing, and a fabric material interposed between said casing and the cellular material and permanently secured to said bead.

4. In a tire structure, the combination of a casing, a body of cellular material inclosed by said casing, a single rim engaging bead formed on said casing, and a core embedded in said cellular material and consisting of an annular strip of material lying in concentric relation to said bead.

In testimony whereof I have signed my name to this specification this 20th day of April, 1920.

GEORGE W. RODE, Jr.